United States Patent [19]

Marsh et al.

[11] Patent Number: 5,573,474
[45] Date of Patent: Nov. 12, 1996

[54] METHOD FOR CONTROLLING IGNITION TIMING FOR AN INTERNAL COMBUSTION ENGINE

[75] Inventors: Richard A. Marsh, Beverly Hills; David P. Garrett, Sylvan Lake; Paul A. Bauerle, Dewitt; David S. Mathews, Okemos; Michael J. Vanek, South Lyon; Anthony E. Cubr, Flint, all of Mich.

[73] Assignee: General Motors Corporation, Detroit, Mich.

[21] Appl. No.: 267,320

[22] Filed: Jun. 28, 1994

[51] Int. Cl.⁶ ............................ B60K 41/06; B60K 41/28; F02P 5/15
[52] U.S. Cl. ................................. 477/9.1; 477/111
[58] Field of Search ................................. 123/419, 418, 123/422, 423; 477/102, 110, 111, 91

[56] References Cited

U.S. PATENT DOCUMENTS

| | | | |
|---|---|---|---|
| 4,509,477 | 4/1985 | Takao et al. | 123/419 |
| 4,512,309 | 4/1985 | Tansuwan | 123/425 |
| 4,844,026 | 7/1989 | Tomisawa | 123/419 |
| 4,852,537 | 9/1989 | Nagano et al. | 123/419 |
| 4,870,935 | 10/1989 | Araki | 123/422 |
| 4,887,573 | 12/1989 | Fujiwara et al. | 123/422 |
| 4,909,224 | 3/1990 | Nishiyama et al. | 123/492 |
| 5,070,841 | 12/1991 | Fujimoto et al. | 123/422 |
| 5,070,843 | 12/1991 | Komurasaki | 123/425 |
| 5,119,782 | 6/1992 | Kashiwabara et al. | 123/422 |

OTHER PUBLICATIONS

SAE Paper 850967 "Vehicle Response to Thorttle Tip–In/Tip–Out", Robert A. Krenz, pp. 45–52 (1986).
SAE Paper 891157 "Nissan's New 'High–Drivability' Vibration Control System", T. Abe; H. Minami; T. Atago; Y. Fujiwara; A. Hashimoto; S. Nakazawa, pp. 335–340 (1989).

*Primary Examiner*—Andrew M. Dolinar
*Attorney, Agent, or Firm*—Timothy G. Gorbatoff

[57] ABSTRACT

An ignition timing control method for a vehicle which provides an engine torque output waveform for canceling vibrational disturbances caused by sudden throttle plate movement resulting in engine accelerations and decelerations. The ignition timing is variably advanced and retarded in accordance with a phase-shifted derivative of engine speed to produce an appropriate engine torque output waveform for optimally canceling the vehicle vibrational disturbances. The phase shift is accomplished by applying a time delay to the engine speed derivative. A negative bias is added to the ignition timing for retarding ignition timing by a predetermined amount to permit a full sinusoidal canceling waveform. A blend multiplier is utilized to gradually remove the effects of the canceling waveform and bias, thereby gradually returning the ignition timing to its original setting.

5 Claims, 3 Drawing Sheets

METHOD FOR CONTROLLING IGNITION TIMING FOR AN INTERNAL COMBUSTION ENGINE

This invention relates to a method for controlling ignition timing for an internal combustion engine, and more particularly, to such a method which variably retards and advances ignition timing to eliminate vehicle vibration during engine accelerations and decelerations.

BACKGROUND OF THE INVENTION

Rapid throttle plate maneuvers resulting in sudden engine acceleration or deceleration generate powertrain torque disturbances which may produce objectionable vehicle vibrational disturbances to occupants. The vibrational disturbances are comprised of transient, generally sinusoidal, longitudinal vibrations of the vehicle which gradually dampen out. These vibrational disturbances result in engine speed variations.

Prior art methods for minimizing the vibrational disturbances have comprised controlling the engine's ignition timing to produce a counteracting engine torque output. Such control methods have included (i) retarding the ignition timing by a predetermined value from its original setting at the moment of initial throttle plate movement, then restoring the timing to its original setting, or (ii) incrementally advancing and retarding the ignition timing in accordance with a derivative of engine speed.

The prior art methods of retarding the ignition timing by a predetermined value is directed to minimizing the largest vibrational disturbance which occurs at the time of initial acceleration. However, initiating ignition timing retard at the moment of initial throttle plate movement, prior to actual vehicle acceleration, rather than immediately preceding the vehicle acceleration often results in an initial ignition timing retard overcompensation characterized by significant torque loss, sluggish acceleration and possible misfire. Minimizing these undesirable characteristics requires limiting the amount of ignition timing retarded. Unfortunately, this also limits the degree to which vibrational disturbances can be counteracted.

The prior art methods of incrementally advancing and retarding ignition timing in accordance with a derivative of engine speed (ΔRPM) is directed to minimizing the transient, sinusoidal, longitudinal vibrations by producing an appropriate engine torque output waveform for canceling the vibrations. However, the canceling waveform should be aligned 180° out-of-phase with the waveform it is intended to cancel and not, as with the prior art, with the derivative of the waveform. As such, the prior art does not provide for an optimal canceling effect.

SUMMARY OF THE INVENTION

The present invention is directed to an ignition timing control method for a vehicle which provides an engine torque output waveform for canceling vibrational disturbances caused by sudden accelerations and decelerations.

According to one aspect of the present invention, the ignition timing is variably advanced and retarded in accordance with a phase-shifted derivative of engine speed (ΔRPM) to produce an appropriate engine torque output waveform for canceling the vehicle vibrational disturbances. The phase shifting is accomplished by applying a time delay to the engine speed derivative. The amount of delay, and therefore the phase shift, is selected as a function of ΔRPM and a vehicle transmission operational state to provide for an alignment of the canceling waveform's maximum negative amplitude with the engine speed waveform's maximum positive amplitude, resulting in an optimal canceling effect.

Because ignition timing is generally set to provide near maximum torque, advancing ignition timing too much may result in reduced torque, rendering the system uncontrollable and ineffective. Therefore, according to another aspect of the present invention, a negative bias is added to the ignition timing prior to engine accelerations and decelerations for retarding ignition timing by a predetermined amount. In so doing, the torque output of the engine is uniformly reduced, permitting ignition timing advance and retard control wherein ignition timing advance will result in an engine torque increase from the "reduced" condition rather than a torque decrease.

According to yet another aspect of the present invention, a blend multiplier is utilized to gradually remove the effects of the canceling waveform and bias, thereby gradually returning the ignition timing to its original setting.

DETAILED DESCRIPTION OF THE PREFERRED EMBODIMENT

Figure 1:
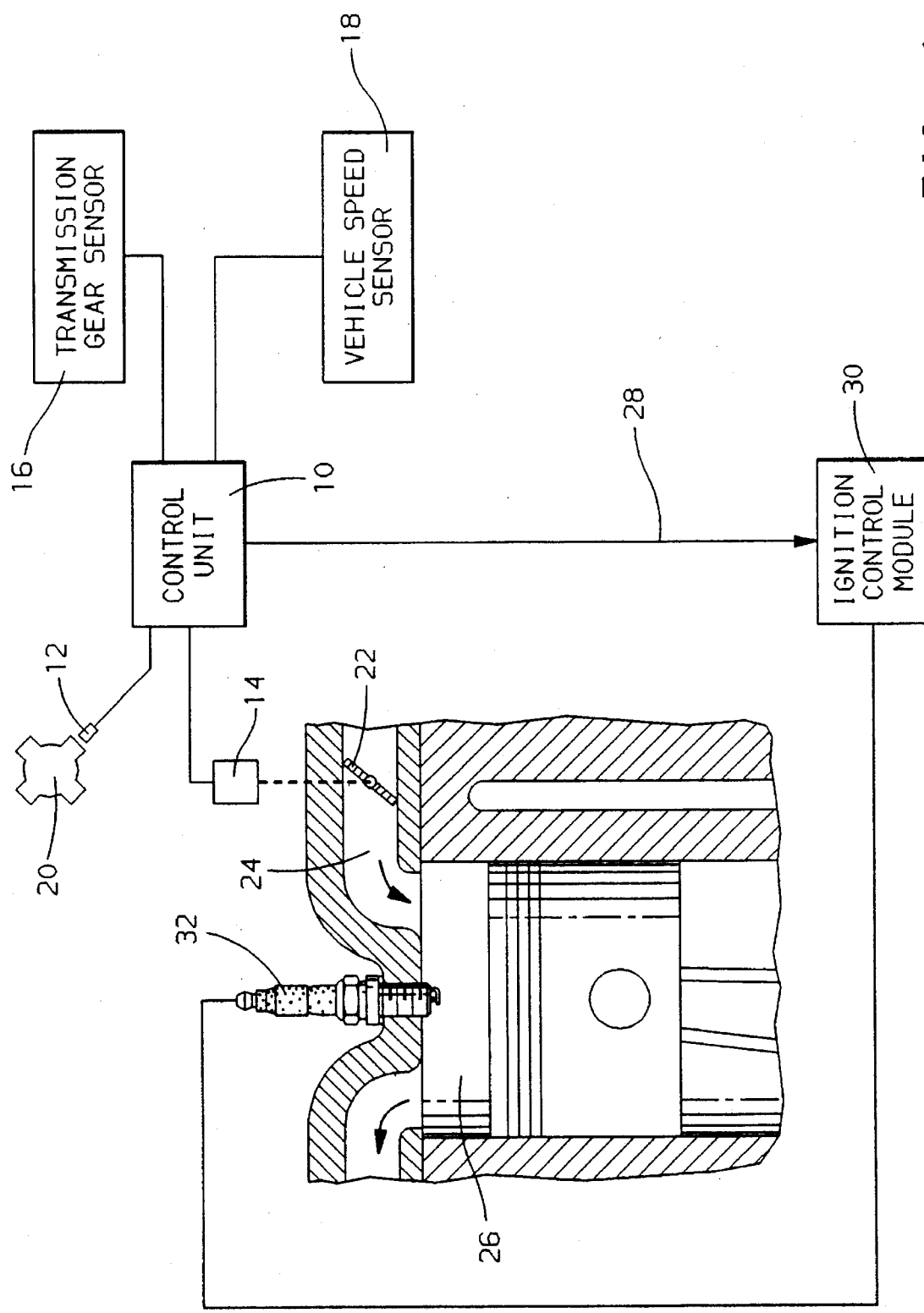
FIG. 1 illustrates a schematic view of an ignition timing control system for an internal combustion engine in accordance with the present invention.

Referring to the drawings, FIG. 1 illustrates a schematic view of an ignition timing control system for an internal combustion engine in accordance with the present invention. A vehicle on-board microprocessor-based control unit 10 receives input signals from an engine rotational speed sensor 12, throttle plate position sensor 14, vehicle speed sensor 18 and, if the vehicle is equipped with an electronically-controlled automatic transmission, a transmission gear sensor 16.

The engine speed sensor 12 typically comprises a crankshaft sensing device which outputs a signal every predetermined angle of crankshaft 20 rotation. The throttle plate position sensor 14 outputs a signal corresponding to the position of the throttle plate 22 in the engine intake airway 24. The throttle plate 22 controls the rate of air flow into the engine.

For vehicles equipped with electronically-controlled automatic transmissions, the transmission gear sensor 16 detects the current transmission gear being electronically commanded (i.e., engaged and transmitting engine torque), or, if no gear is commanded, an idle condition. The commanded gear and idle condition identify the current operating condition of the transmission, which will hereinafter be referred to as the transmission state. Automatic transmissions are also equipped with a torque converter clutch which can be in one of a locked or unlocked position. Operation of the clutch is controlled by the control unit 10. As such, the control unit 10 does not require a sensor for detecting the position of the torque converter clutch, the position being a known parameter. For vehicles equipped with manual or hydraulically-controlled transmissions, the gear engaged is determined by a calculation based upon the sensed engine speed and vehicle speed.

In response to the input signals received, as well as the known and calculated parameters, the control unit 10 outputs ignition timing control signals via signal line 28 to a vehicle on-board ignition control module 30 for firing the engine spark plugs 32 at varied times. The ignition timing control signals are calculated in accordance with a control logic executed by the control unit 10. The control logic will be described in more detail with reference to FIG. 4.

Vehicle accelerations and decelerations are initiated by the vehicle driver's movement of an accelerator pedal which, in turn, controls the positioning of a throttle plate 22 in the engine intake airway 24 for regulating the amount of air entering the engine. Vehicle accelerations and decelerations are anticipated by the control unit 10 via changes in the position of the throttle plate 22 as sensed by the throttle plate position sensor 14. The faster the throttle plate movement, the greater the anticipated acceleration or deceleration.

Figure 2A:
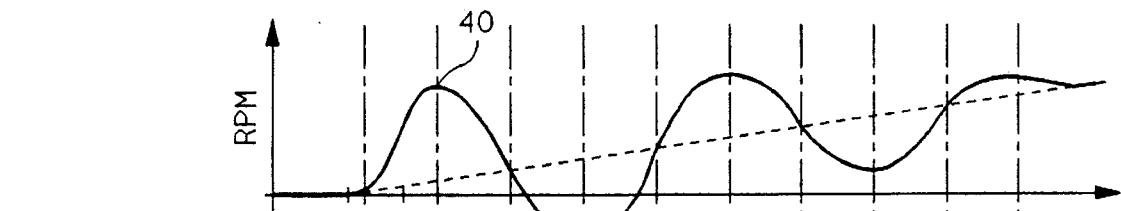
FIGS. 2A–2D illustrate graphs of an uncorrected engine speed, a derivative of the uncorrected engine speed, an engine torque output canceling waveform and a corrected engine speed, respectively.

Referring to FIG. 2A there is illustrated a graph of uncorrected engine speed (RPM) variations occurring during a sudden vehicle acceleration initiated by movement of the throttle plate 22 at time $t_0$. Vehicle vibrational disturbances relating to gear lash and driveline component torsional characteristics result in these engine speed variations. The engine speed variations, which are generally sinusoidal in nature, decrease in amplitude (dampen) as the engine traverses from a lower to higher speed, the first amplitude 40 being the largest.

Figure 2B:
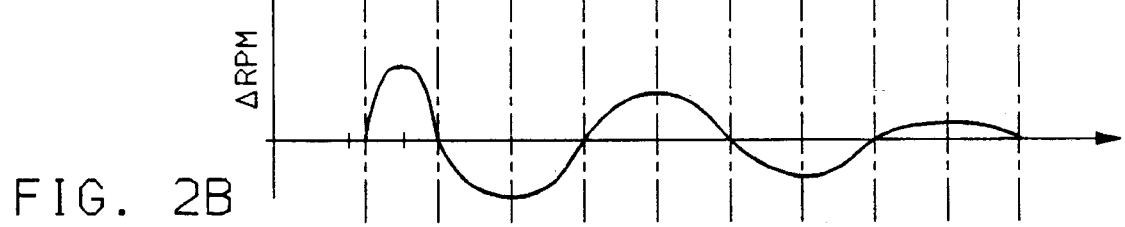

FIG. 2B illustrates a graph of the derivative of the engine speed signal of FIG. 2A. As a derivative, it corresponds to the change in engine speed over time. The graph of FIG. 2B, hereinafter referred to as ΔRPM, is (i) at a maximum positive value at points along the graph of FIG. 2A of greatest positive slope, (ii) at a maximum negative value at points along the graph of FIG. 2A of greatest negative slope, and (iii) at zero at points along the graph of FIG. 2A with zero slope.

Figure 2C:
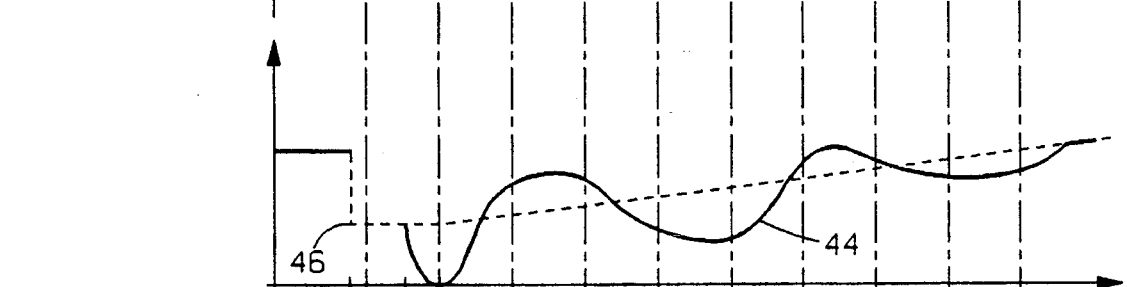

FIG. 2C illustrates an ignition timing correction signal 44, otherwise known as the engine torque output canceling waveform, which corresponds to a negative or inverse of the ΔRPM graph of FIG. 2B (i.e., a mirror-image) which is phase shifted and multiplied by a gain factor. The gain factor (GAIN1–14) is determined by means of a look-up table, as illustrated in TABLE 1 below, as a function of the sign (+/–) of ΔRPM and the current transmission state which, in the case of an automatic transmission, includes the throttle plate position and torque converter clutch condition.

TABLE 1

| ΔRPM | MANUAL TRANSMISSION STATE | AUTOMATIC TRANSMISSION STATE | GAIN FACTOR |
| --- | --- | --- | --- |
| negative | 1 | 1 | GAIN1 |
| negative | 2 | 2 | GAIN2 |
| negative | 3 | Throttle Open Clutch Unlocked | GAIN3 |
| negative | 4 | Throttle Open Clutch Locked | GAIN4 |
| negative | 5 | Throttle Closed Clutch Unlocked | GAIN5 |
| negative | 6 | Throttle Closed Clutch Locked | GAIN6 |

TABLE 1-continued

| ΔRPM | MANUAL TRANSMISSION STATE | AUTOMATIC TRANSMISSION STATE | GAIN FACTOR |
| --- | --- | --- | --- |
| negative | Idle | Idle | GAIN7 |
| positive | 1 | 1 | GAIN8 |
| positive | 2 | 2 | GAIN9 |
| positive | 3 | Throttle Open Clutch Unlocked | GAIN10 |
| positive | 4 | Throttle Open Clutch Locked | GAIN11 |
| positive | 5 | Throttle Closed Clutch Unlocked | GAIN12 |
| positive | 6 | Throttle Closed Clutch Locked | GAIN13 |
| positive | Idle | Idle | GAIN14 |

As mentioned above, vehicle vibrational disturbances result in engine speed variations. This makes the derivative of engine speed a good measure of the vehicle disturbances. When engine speed is not varying, ΔRPM is zero. When engine speed begins to vary, it shows up in ΔRPM.

For optimal cancellation, the engine speed variations, as represented by the signal of FIG. 2A, and the engine output torque canceling waveform, represented by signal 44 of FIG. 2C, should be aligned 180° out-of-phase such that the maximum negative amplitude 42 of FIG. 2C occurs simultaneously with the maximum positive amplitude 40 of FIG. 2A. As noted by comparing the ΔRPM waveform of FIG. 2B with the engine speed waveform of FIG. 2A, a phase shift is required for alignment. This is graphically represented in FIG. 2C as the time delay between $t_2$ and $t_3$, which effectively shifts the canceling waveform 44 of FIG. 2C to the right.

The amount of phase shift (PHASE1–7) is determined by means of a look-up table, as illustrated in TABLE 2 below, as a function of the current transmission state which, in the case of an automatic transmission, includes the throttle plate position and torque converter clutch condition. The phase shift can be predetermined because the frequency of engine speed oscillation is typically 2–4 Hz, depending upon the above noted factors. The exact values are determined during vehicle design. Once the frequency of oscillations are known, the amount of phase shift can be calculated and the required time delay determined to produce the desired phase delay.

TABLE 2

| MANUAL TRANSMISSION STATE | AUTOMATIC TRANSMISSION STATE | PHASE SHIFT |
| --- | --- | --- |
| 1 | 1 | PHASE1 |
| 2 | 2 | PHASE2 |
| 3 | Throttle Open Clutch Unlocked | PHASE3 |
| 4 | Throttle Open Clutch Locked | PHASE4 |
| 5 | Throttle Closed Clutch Unlocked | PHASE5 |
| 6 | Throttle Closed Clutch Locked | PHASE6 |
| Idle | Idle | PHASE7 |

Figure 3:
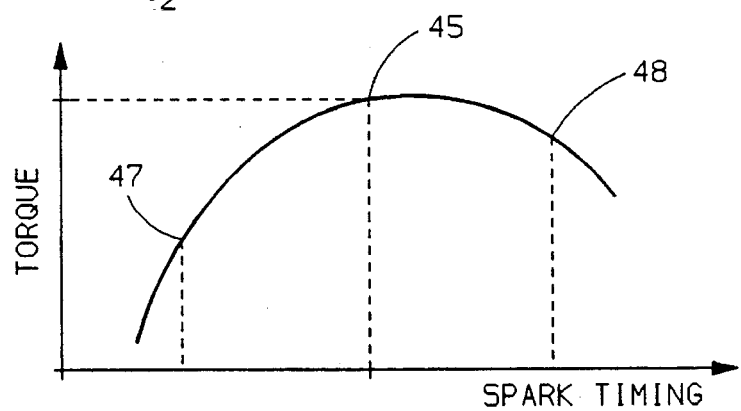
FIG. 3 illustrates a graph of engine torque output versus spark timing.

FIG. 2C also illustrates a negative bias term 46 which is added to the basic ignition timing for retarding ignition timing upon the occurrence of a rapid accelerator pedal maneuver. The purpose of adding the negative bias is illustrated in FIG. 3. Referring to FIG. 3, ignition timing is generally set to provide near maximum torque (e.g., at point 45). Recall that the torque canceling waveform 44 illustrated in FIG. 2C is produced by advancing and retarding ignition timing to provide for increasing and decreasing torque, respectively. However, if the ignition timing is already near maximum torque, advancing ignition timing too much (e.g., to point 48) could ultimately result in reduced torque, rendering the system uncontrollable and ineffective. By using the negative bias to temporarily reduce the output torque of the engine (e.g., to point 47), sufficient room for developing a full sinusoidal torque canceling waveform is available.

Referring back to FIG. 2C, adding the negative bias 46 at the moment of initial accelerator pedal maneuver $t_0$ would result in retarded ignition timing prior to actual vehicle acceleration $t_1$, thereby inducing significant engine torque loss, sluggish acceleration and possible misfire. For this reason, the bias 46 is not immediately added upon the occurrence of a rapid accelerator pedal maneuver. Rather, it is delayed by an amount referred to as the bias delay, graphically represented in FIG. 2C as the time between $t_0$ and $t_1$. The amount of bias (BIAS1–7) and bias delay (DELAY1–7) are preselected during design of the vehicle and determined during vehicle operation by means of a look-up table, as illustrated in TABLE 3 below, as a function of the current transmission state which, in the case of an automatic transmission, includes the throttle plate position and torque converter clutch condition. The bias delay is designed such that its value results in the addition of the negative bias term 46 coincident with engine acceleration at time $t_1$.

TABLE 3

| MANUAL TRANSMISSION STATE | AUTOMATIC TRANSMISSION STATE | BIAS | BIAS DELAY |
| --- | --- | --- | --- |
| 1 | 1 | BIAS1 | DELAY1 |
| 2 | 2 | BIAS2 | DELAY2 |
| 3 | Throttle Open Clutch Unlocked | BIAS3 | DELAY3 |
| 4 | Throttle Open Clutch Locked | BIAS4 | DELAY4 |
| 5 | Throttle Closed Clutch Unlocked | BIAS5 | DELAY5 |
| 6 | Throttle Closed Clutch Locked | BIAS6 | DELAY6 |
| Idle | Idle | BIAS7 | DELAY7 |

The ignition timing is retarded by the bias amount 46 until time $t_4$, corresponding to the maximum engine rotational disturbance 40 of FIG. 2A, at which point the bias amount is gradually decreased until completely removed. Failure to gradually remove the bias would result in overcompensation as the engine speed variations decreased, and sluggish acceleration followed by a sudden engine power surge as the bias was suddenly removed.

Figure 2D:
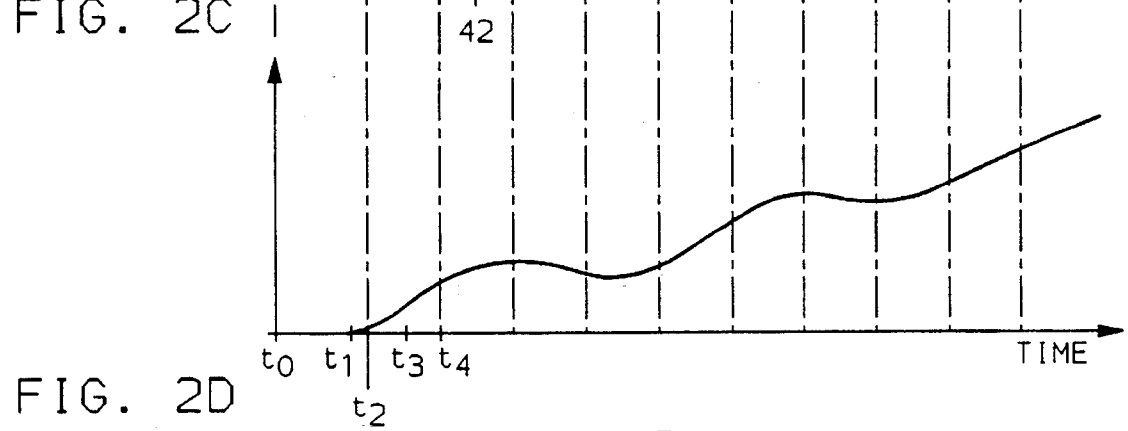

FIG. 2D illustrates a graph of the corrected engine speed, defined as the sum of the uncorrected engine speed of FIG. 2A, the canceling waveform 44 of FIG. 2C and the negative bias term 46 of FIG. 2C. Notice that the speed variations of the corrected engine speed of FIG. 2D is much reduced from the speed variations of the uncorrected engine speed of FIG. 2A.

By enabling the control unit 10 of FIG. 1 to advance and retard the basic ignition timing to produce the engine torque output waveform illustrated in FIG. 2C, the present invention is capable of producing a waveform for canceling the sinusoidal vibrational disturbances of the vehicle.

Figure 4:
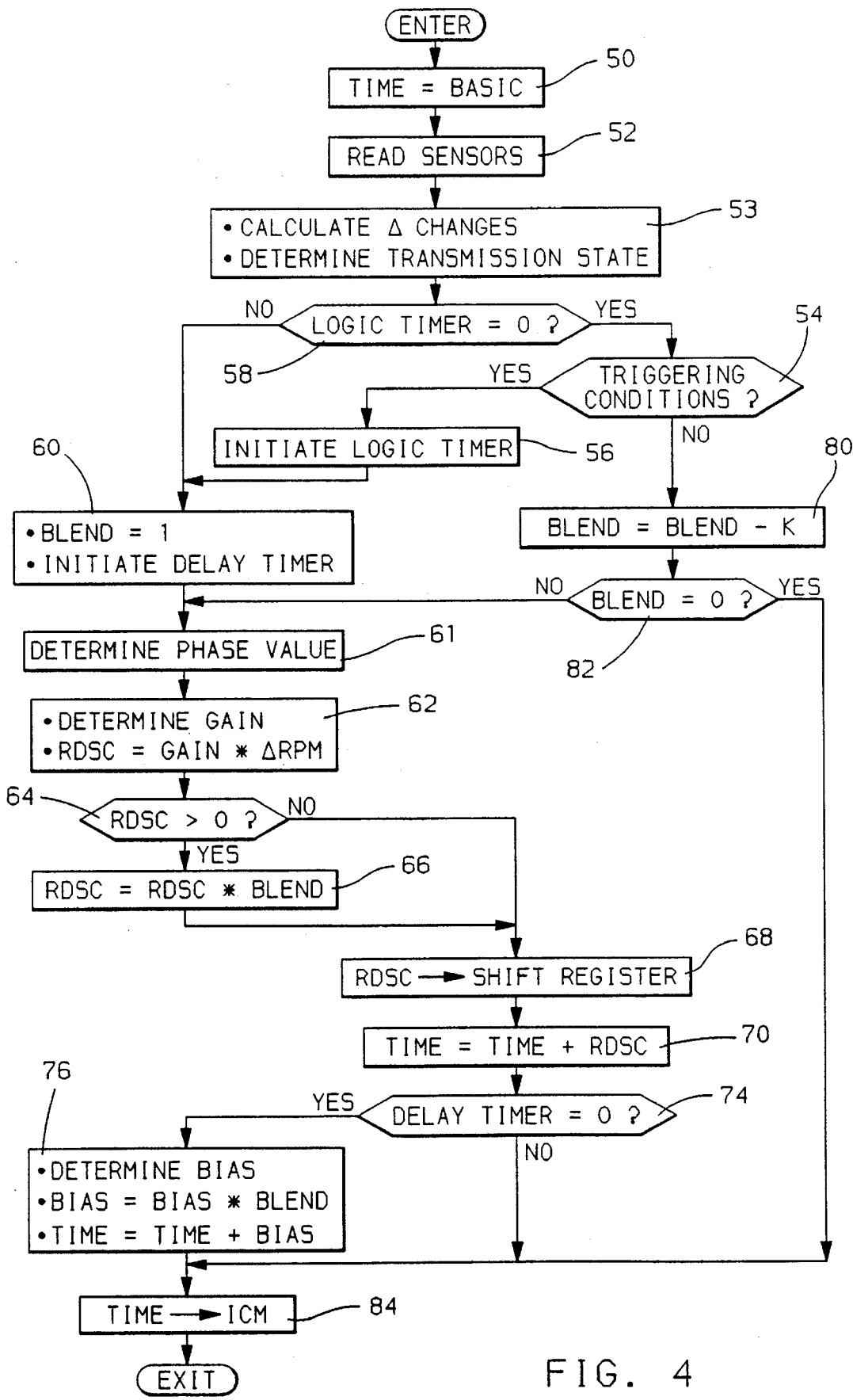
FIG. 4 illustrates a control logic flow chart for executing an ignition timing control system in accordance with the present invention.

FIG. 4 illustrates a computer logic flow chart executed by the control unit 10 of FIG. 1 for performing ignition timing control in accordance with the present invention. Referring to FIG. 4, the algorithm begins at step 50 by setting the current ignition timing value (TIME) to the basic, uncorrected ignition timing value (BASIC) of the vehicle, a known parameter within the control unit 10.

The engine RPM sensor 12, engine throttle plate position sensor 14, transmission gear sensor 16 and vehicle speed sensor 18 are next read in step 52. In step 53, changes in engine RPM ($\Delta$RPM) and throttle plate position occurring since the last sensor reading are calculated. Step 53 also determines a transmission state based upon (i) the current transmission gear being commanded, as sensed by the transmission gear sensor 16, if the vehicle is equipped with an electronically-controlled automatic transmission, or (ii) engine RPM and vehicle speed, if the vehicle is equipped with a manual or hydraulically-controlled transmission.

After determining a logic timer (LOGIC) value is zero in step 58, predetermined vehicle triggering conditions are monitored in step 54. If they are detected, the LOGIC timer is initiated in step 56. Vehicle triggering conditions may comprise changes in the engine throttle plate position greater than a predetermined change or changes in the transmission torque converter clutch condition (locked versus unlocked). Step 58 thereafter monitors the value of the LOGIC timer to determine when it has timed-out. As long as the LOGIC timer has been initiated and not yet timed-out, step 60 sets a blend multiplier value (BLEND) to "1" and initiates a bias delay timer (DELAY). The value of the bias delay timer is determined by means of a look-up table, as illustrated in TABLE 3, as a function of the current transmission state which, in the case of an automatic transmission, includes the throttle plate position and torque converter clutch condition.

In step 61, the value of a phase delay (PHASE) is determined by means of a look-up table, as illustrated in TABLE 2, as a function of the current transmission state which, in the case of an automatic transmission, includes the throttle plate position and torque converter clutch condition. The function of the PHASE delay will be discussed below with reference to step 70.

In step 62, the value of a gain factor (GAIN) is determined by means of a look-up table, as illustrated in TABLE 1, as a function of $\Delta$RPM and the current transmission state which, in the case of an automatic transmission, includes the throttle plate position and torque converter clutch condition. Further, the GAIN factor is multiplied by the $\Delta$RPM value of step 52 to arrive at an ignition timing correction signal term, referred to as the RDSC (RPM Derivative Spark Control) Spark term. The RDSC Spark term can be either a positive or negative number for advancing or retarding, respectively, the ignition timing of the vehicle.

In step 66, all positive values of the RDSC Spark term, as determined by step 64, are multiplied by the current BLEND multiplier value. In step 68, the RDSC Spark term is stored in a shift register (SHIFT) for delayed delivery to the Ignition Timing Module 30 of FIG. 1, the delayed delivery resulting in a phase shift of the RDSC Spark term. Use of a blend multiplier keeps the vehicle ignition timing from being advanced too far (e.g., to point 48 in FIG. 3), resulting in a reduced torque and an uncontrollable and ineffective system.

Recall that in step 61, the amount of required PHASE delay was determined. The value of PHASE represents the number of shifts within the shift register the RDSC Spark term must encounter before exiting the register. In step 70, the RDSC Spark term is shifted out of the SHIFT register and is added to the current ignition TIME value, updating its value.

The bias DELAY timer, initiated in step 60, is continuously monitored at step 74. Once the bias DELAY timer has timed out, step 76 proceeds to (i) determine a bias value (BIAS) by means of a look-up table, as illustrated in TABLE 3, as a function of the current transmission state which, in the case of an automatic transmission, includes the throttle plate position and the torque converter clutch condition, (ii) updates the BIAS value by multiplying it by the current BLEND multiplier value, and (iii) add the updated BIAS value to the current ignition TIME value. In step 84, the current ignition TIME value, which may include RSDC and BIAS adjustments from step 70 and/or step 76, is sent to the Ignition Control Module (ICM) 30 of FIG. 1 by the control unit 10 via signal line 28.

Referring back to step 58, if the LOGIC timer times-out and no new triggering conditions are detected in step 54, the BLEND multiplier which was initially set to "1" in step 60 is gradually reduced to zero in step 80 by incrementally subtracting a constant value K during each operation of the logic algorithm. This results in a simultaneous reduction of the BIAS value (in step 76) and the RDSC Spark term (in step 66) to zero. Once the BLEND multiplier has reached zero, as determined in step 82, step 84 sends the current ignition TIME value to the Ignition Control Module (ICM) 30 of FIG. 1, whereupon the program exits. The value of TIME, with the BLEND multiplier equal to zero, is equivalent to the BASIC ignition timing of the vehicle in accordance with step 50.

While the present invention has been described in reference to the illustrated embodiments, it will be recognized that various modifications will occur to those skilled in the art. In this regard, it will be understood that methods and apparatuses incorporating such modifications may fall within the scope of this invention, which is defined by the appended claims.

The embodiments of this invention in which an exclusive property or privilege is claimed are defined as follows:

1. A method for controlling ignition timing of an internal combustion engine for a vehicle having a transmission, the engine having a throttle plate for controlling the rate of flow of air flow into the engine, the method minimizing vehicle vibrations during engine accelerations and comprising the steps of:

sensing an engine rotational speed;

sensing an engine throttle plate position;

calculating a change in the sensed engine throttle plate position over a first predetermined time period;

calculating a change in the sensed engine rotational speed over a second predetermined time period when the change in the sensed engine throttle plate exceeds a predetermined value, the change in the sensed engine rotational speed having a generally sinusoidal waveform with decreasing amplitudes over time, representative of vehicle vibration during engine acceleration.;

retarding ignition timing by adding a first variable-dependent amount to the ignition timing for a variable-dependent time period when the change in sensed engine throttle plate position exceeds the predetermined value, and thereafter gradually removing the first variable-dependent amount from the ignition timing, the first variable-dependent amount having a predetermined constant value dependent upon vehicle operational parameters; and advancing and retarding ignition timing by adding a second variable-dependent amount to the ignition timing when the change in the sensed engine throttle plate position exceeds the predetermined value, the second variable-dependent amount being a function of a phase-shifted inverse of the change in the sensed engine rotational speed, the second variable-dependent amount having a generally sinusoidal waveform with decreasing amplitudes over time and being phase-shifted by an amount, dependent upon vehicle operational parameters, to provide for an optimal canceling effect of vehicle vibration.

2. The method for controlling ignition timing according to claim 1, further comprising the step of sensing a vehicle transmission operational state wherein the first and second variable-dependent amounts, the variable-dependent time period and the phase-shifted amount are determined as a function of the sensed vehicle transmission operational state.

3. A method for controlling ignition timing of an internal combustion engine for a vehicle having a transmission, the engine having a throttle plate for controlling the rate of flow of air flow into the engine, the method minimizing vehicle vibrations during engine accelerations and comprising the steps of:

sensing an engine rotational speed;

sensing an engine throttle plate position;

determining a transmission operational state, the transmission operational state comprising one of a plurality of transmission gears being engaged and transmitting engine torque, or idle if not transmission gears are engaged;

calculating a change in the sensed engine rotational speed over a first predetermined time period;

calculating a change in the sensed engine throttle plate position over a second predetermined time period;

determining a bias value and bias delay time as a function of the transmission operational state and sensed throttle plate position;

retarding ignition timing by adding the bias value to the ignition timing at the conclusion of the bias delay time, the bias delay time commencing when the change in sensed engine throttle plate position exceeds a predetermined value, the bias value being gradually removed commencing at the conclusion of a third predetermined time period;

determining a phase delay time as a function of the transmission operational state and sensed throttle plate position;

determining a gain factor as a function of the change in the sensed engine rotational speed, transmission operational state and sensed throttle plate position;

calculating an ignition timing correction quantity as the change in the sensed engine rotational speed multiplied by the gain factor;

storing the ignition timing correction quantity in a shift register for a period corresponding to the phase delay time; and advancing and retarding ignition timing by adding the ignition timing correction quantity to the ignition timing at the conclusion of the phase delay time and thereafter gradually removing the ignition timing correction quantity from the ignition timing at the conclusion of a third predetermined time period.

4. The method of controlling ignition timing according to claim 3, further comprising the step of determining a torque converter clutch condition, the torque converter clutch being in one of a locked and unlocked condition, wherein the vehicle transmission is an automatic transmission.

5. The method of controlling ignition timing according to claim 3, further comprising the step of sensing vehicle speed, wherein the vehicle transmission is a manual transmission.

* * * * *